(12) United States Patent
Davis et al.

(10) Patent No.: US 11,465,357 B2
(45) Date of Patent: Oct. 11, 2022

(54) SYSTEMS AND METHODS FOR CONFORMAL ADDITIVE MANUFACTURING

(71) Applicant: The Johns Hopkins University, Baltimore, MD (US)

(72) Inventors: Joshua D. Davis, Baltimore, MD (US); Michael D. M. Kutzer, Baltimore, MD (US); Gregory S. Chirikjian, Towson, MD (US); Paul Biermann, Columbia, MD (US); Robert Matteson, Walkersville, MD (US); Ryan Forrest, Columbia, MD (US)

(73) Assignee: The Johns Hopkins University, Baltimore, MD (US)

(*) Notice: Subject to any disclaimer, the term of this patent is extended or adjusted under 35 U.S.C. 154(b) by 973 days.

(21) Appl. No.: 15/078,668

(22) Filed: Mar. 23, 2016

(65) Prior Publication Data
US 2016/0279882 A1    Sep. 29, 2016

Related U.S. Application Data

(60) Provisional application No. 62/137,715, filed on Mar. 24, 2015.

(51) Int. Cl.
| | |
|---|---|
| *B29C 67/00* | (2017.01) |
| *B29C 64/393* | (2017.01) |
| *B33Y 10/00* | (2015.01) |
| *B33Y 30/00* | (2015.01) |
| *B33Y 50/02* | (2015.01) |

(52) U.S. Cl.
CPC .......... *B29C 64/393* (2017.08); *B33Y 10/00* (2014.12); *B33Y 30/00* (2014.12); *B33Y 50/02* (2014.12)

(58) Field of Classification Search
CPC ........ B33Y 10/00; B33Y 30/00; B33Y 50/00; B33Y 50/02; B29C 64/00; B29C 64/106; B29C 64/118; B29C 64/241
See application file for complete search history.

(56) References Cited

U.S. PATENT DOCUMENTS

| | | | | |
|---|---|---|---|---|
| 4,884,309 | A * | 12/1989 | Shafir | A43D 1/04 12/1 R |
| 2013/0295338 | A1* | 11/2013 | Keating | B28B 19/003 428/174 |
| 2014/0202595 | A1* | 7/2014 | Hofmann | C23C 4/129 148/522 |
| 2015/0021830 | A1* | 1/2015 | Yerazunis | B29C 64/241 264/401 |
| 2015/0040428 | A1* | 2/2015 | Davis | B29D 35/142 36/83 |
| 2015/0193559 | A1* | 7/2015 | Musuvathy | B29C 64/386 703/1 |
| 2015/0239178 | A1* | 8/2015 | Armstrong | G06F 30/18 700/98 |
| 2015/0367375 | A1* | 12/2015 | Page | B29C 64/10 118/697 |

(Continued)

*Primary Examiner* — Ryan M Ochylski
(74) *Attorney, Agent, or Firm* — Harrity & Harrity, LLP

(57) ABSTRACT

Systems and methods for conformal additive manufacturing are disclosed. In particular, systems and methods are disclosed utilizing variable offset curves and/or a manipulated solution to Laplace's equation to generate layers between an initial boundary and a desired boundary.

21 Claims, 12 Drawing Sheets

(56) References Cited

U.S. PATENT DOCUMENTS

| | | | |
|---|---|---|---|
| 2016/0096318 A1* | 4/2016 | Bickel | B29C 67/0051 264/40.1 |
| 2016/0101565 A1* | 4/2016 | John Van Liew | B29C 64/106 427/256 |
| 2016/0121555 A1* | 5/2016 | Kune | B29C 64/118 264/219 |
| 2016/0176109 A1* | 6/2016 | Farmer | B29C 64/245 264/171.1 |
| 2016/0263806 A1* | 9/2016 | Gardiner | B32B 7/03 |
| 2016/0263832 A1* | 9/2016 | Bui | B29C 64/188 |
| 2016/0318247 A1* | 11/2016 | Schlachter | B29C 64/245 |
| 2017/0081534 A1* | 3/2017 | Shah | C09D 11/033 |
| 2017/0209958 A1* | 7/2017 | Soshi | B22F 5/106 |
| 2018/0207856 A1* | 7/2018 | Seriani | B29C 64/118 |
| 2018/0297280 A1* | 10/2018 | Silvestro | B29C 31/045 |
| 2019/0210286 A1* | 7/2019 | Newell | B33Y 40/00 |

\* cited by examiner

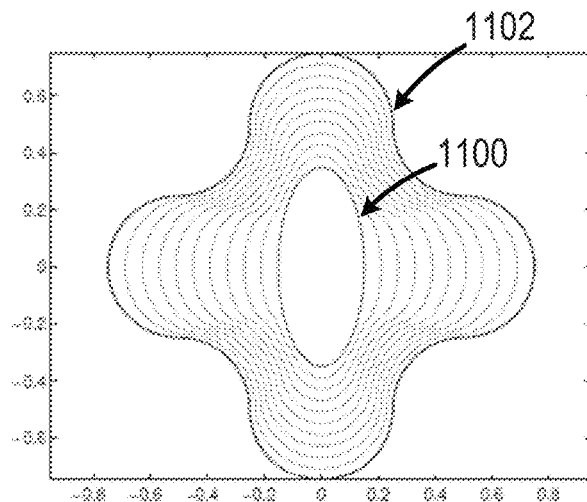 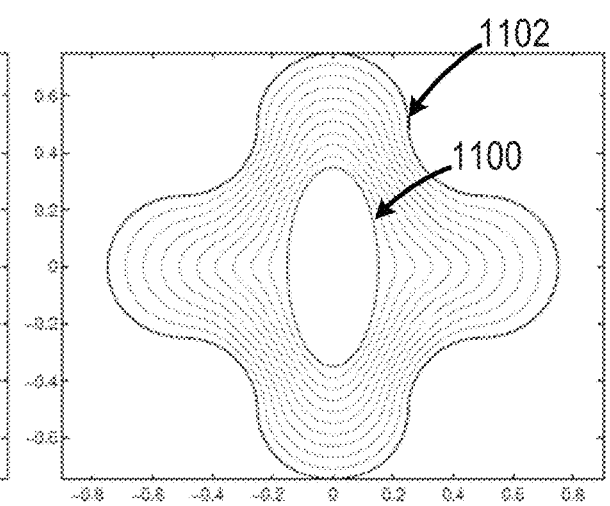
Fig. 11A　　　　　　　　Fig. 11B
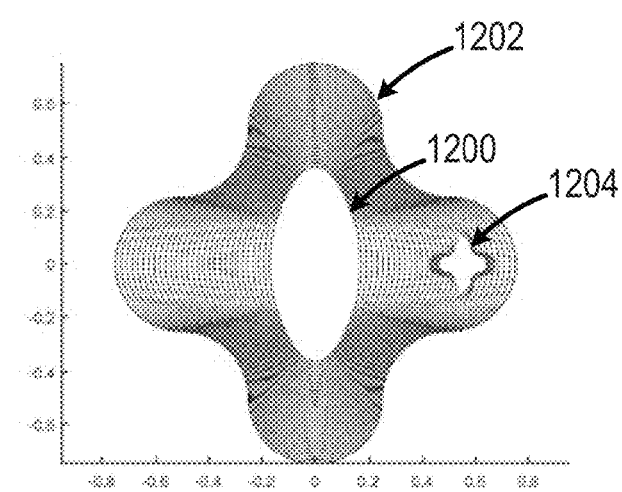 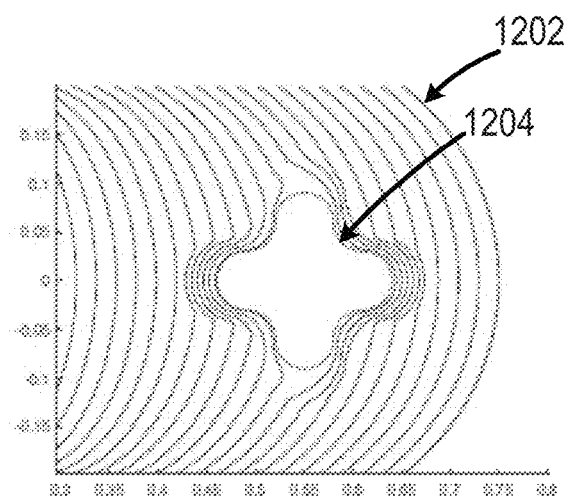
Fig. 12A　　　　　　　　Fig. 12B

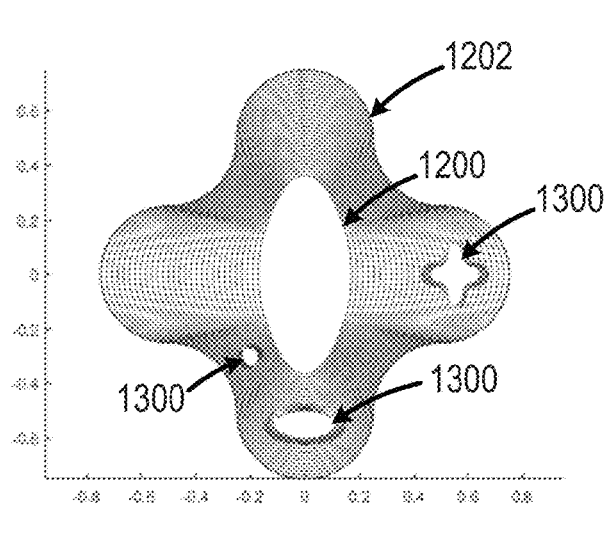
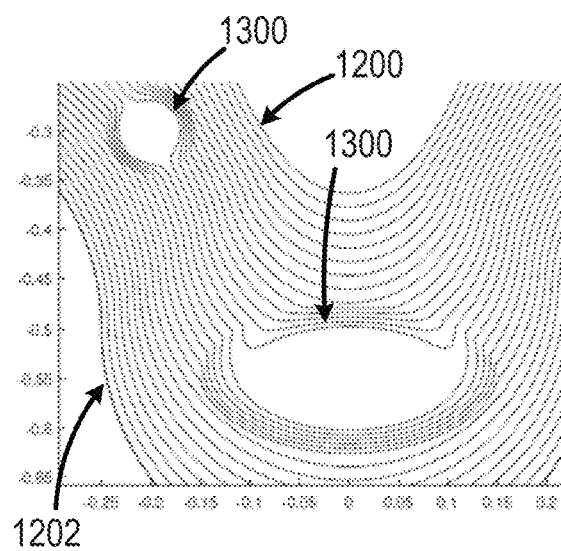
Fig. 13A
Fig. 13B
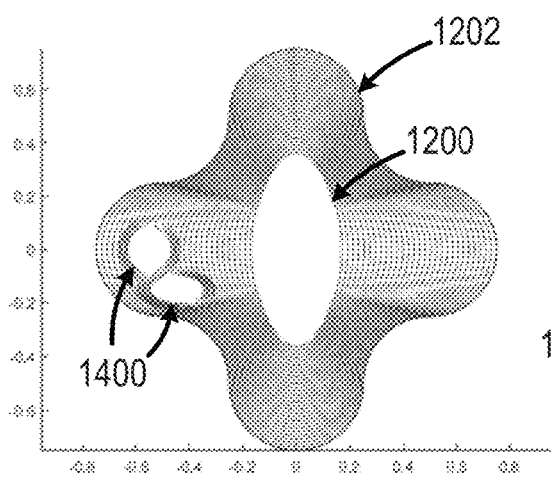
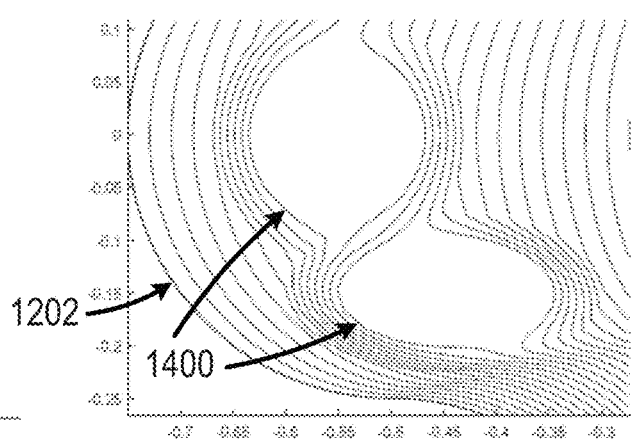
Fig. 14A
Fig. 14B

SYSTEMS AND METHODS FOR CONFORMAL ADDITIVE MANUFACTURING

CROSS-REFERENCES TO RELATED APPLICATIONS

The present application is based on, claims priority to, and incorporates herein by reference in its entirety, U.S. Provisional Patent Application No. 62/137,715, filed Mar. 24, 2015, and entitled "Systems and Methods for Conformal Additive Manufacturing".

GOVERNMENT LICENSE RIGHTS

This invention was made with government support under NIH R21 EB015638 awarded by the National Institutes of Health (NIH). The government has certain rights in the invention.

STATEMENT REGARDING FEDERALLY SPONSORED RESEARCH

Not Applicable.

BACKGROUND

This disclosure relates generally to systems and methods for manufacturing and, more specifically, to systems and methods for conformal additive manufacturing.

The exponential growth of additive manufacturing (AM) or 3D printing technologies in recent years has led to rapid adoption by both the public and private sectors. AM technologies can enable rapid, on-site repair, replacement, and adaptation of mechanical (and potentially electrical) hardware.

Commercial AM technology leverages a variety of processes to bind materials, creating solid structures. Unlike traditional fabrication methods, a direct correlation between AM fabrication-time and part complexity does not necessarily exist. AM fabrication also offers relaxed design rules and simple part-by-part customization. As a result, inexperienced developers can produce physical hardware almost immediately, while experienced designers can create complex parts tailored for specific applications.

As adoption of AM increases, the limitations of current technology will become more distinct. Recent research in AM processes is focused on addressing limitations in properties of printed materials; however, existing methods have yet to be exploited to their full potential. While current AM enables tremendous innovation in part design, designers are still required to follow classical packaging and/or assembly rules.

BRIEF SUMMARY

The present disclosure provides systems and methods for additive manufacturing where layers can be deposited onto an initial geometric object to form a final desired geometric object. The layers can be generated using either variable offset curves (or surfaces for 3D) or a manipulated solution to Laplace's equation. Upon generating the layers between the initial and desired object the layers can be printed conformally on the initial object to create the desired object.

In one aspect, the present disclosure provides a method for additive manufacturing of an object. The method includes defining an initial boundary of the object, defining a desired boundary for the object, and calculating a plurality of curves that extend from the initial boundary and intersect the desired boundary. The method further includes generating a plurality of layers between the initial boundary and the desired boundary utilizing the generated plurality of curves to conformally map the plurality of layers between the initial boundary and the desired boundary, and depositing material in the plurality layers conformally between the initial boundary and the desired boundary to form the object.

In another aspect, the present disclosure provides a system for additive manufacturing of an object. The system includes a print head configured to deposit material onto the object, and a controller. The controller is configured to define an initial boundary of the object, define a desired boundary for the object, and calculate a plurality of curves that extend from the initial boundary and intersect the desired boundary. The controller is further configured to generate a plurality of layers between the initial boundary and the desired boundary utilizing the generated plurality of curves to conformally map the plurality of layers between the initial boundary and the desired boundary, and instruct the print head to deposit material in the plurality of layers conformally on the object between the initial boundary and the desired boundary to form the object.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

FIG. 11A shows ten layers generated for a desired compatible object using variable offset curves.

FIG. 11B shows ten layers generated for a desired compatible object using a manipulated solution to Laplace's equation.

FIG. 12A shows layers generated using variable offset curves for a desired compatible object with a hollow feature between the initial boundary and the final boundary.

FIG. 12B shows a close up view of the layers the hollow feature of FIG. 12A.

FIG. 13A shows layers generated using variable offset curves for a desired compatible object with multiple hollow features between the initial boundary and the final boundary.

FIG. 13B shows a close up view of the layers around multiple hollow features of FIG. 13A.

FIG. 14A shows layers generated using variable offset curves for a desired compatible object with overlapping hollow features between the initial boundary and the final boundary.

FIG. 14B shows a close up view of the layers around the overlapping hollow features of FIG. 14A.

DETAILED DESCRIPTION

Figure 1A:
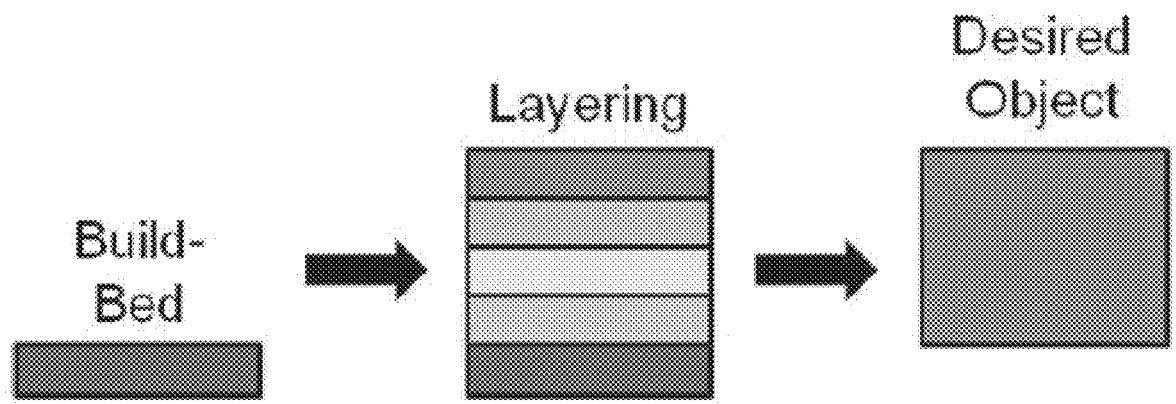
FIG. 1A is a schematic illustration of conventional additive manufacturing.

In current additive manufacturing (AM), parts are made by iteratively adding layers of material. Layers are defined by thin cross-sections of a part, and derived from an exported computer-aided design CAD model. Commercial AM techniques generally use a "build-bed" that serves as the flat substrate for part fabrication. The CAD model is imported into an AM software package, and positioned relative to the build-bed. Layers are then defined by equally spaced planar slices of the CAD model, parallel to the build-bed, as shown in FIG. 1A.

Figure 1B:
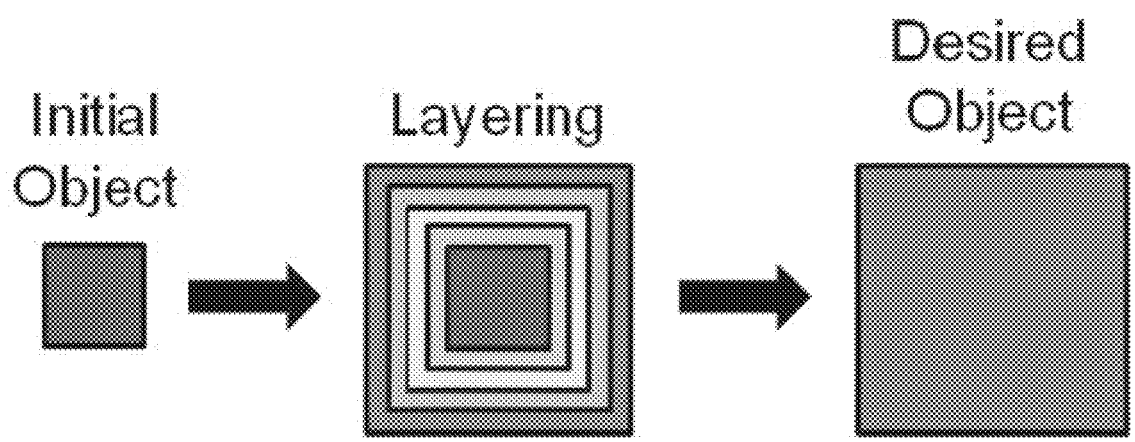
FIG. 1B is a schematic illustration of conformal additive manufacturing.

The concept of conformal printing onto non-planar surfaces has been explored for a variety of applications including subtractive processes like lithography used to produce optics, and additive methods to fabricate antennas and electronics onto/into mechanical components. In general, the AM techniques explored for conformal applications involve direct write technologies used to produce thin features on surfaces, as shown in FIG. 1B.

Despite the advance of AM technologies, methods to fully encase objects with multilayer, thick features are still underdeveloped. These issues can be overcome by printing layers conformally about an object's natural boundary to form a desired geometric object.

Layer Generation using Variable Offset Curves

In one non-limiting example, an additive manufacturing method includes generating layers using variable offset curves (or variable offset surfaces for 3D objects) and printing the layers conformally about an object's natural boundary. Given a parametrized curve $x_0(t)$, a variable offset curve (VOC) can be defined as:

$$x_i(t;r) = x_0(t) + r(t)n(t) \qquad (1)$$

where $r(t) \in R^+$ is a parametrically-varying scalar and $n(t)$ is the unit normal to the curve. It would be known by one of skill in the art that the definition of VOCs in Equation 1 can be extended to include variable offset surfaces. In addition, when describing this non-limiting example using VOCs it will be assumed that every curve or surface is closed and at least $C^2$ continuous. Furthermore restrictions must be imposed to ensure that there is a bijective mapping between an initial boundary and each layer generated.

In particular, it is assumed that the boundary of the initial object is convex and fully contained inside the boundary of the desired object. In this non-limiting example, a surface S is convex for all points $z_1$ and $z_2$ in S and $\alpha \in (0,1)$, it follows that:

$$\alpha z_1 + (1-\alpha) z_2 \in S_i \qquad (2)$$

where $S_i$ is the union of the boundary with its interior.

It is further assumed that, the boundary of the desired object is of a "compatible" nature with respect to the boundary of the initial object, meaning that each point on the boundary of the desired object intersects exactly one outward-pointing normal ray emanating from the initial object's boundary. This definition ensures that the VOC method fully reconstructs the boundary of the desired object for any given convex initial object (i.e., there will be no gaps on the boundary of the desired object that remove curvature, changes in convexity, or other features). Additionally, one may infer from the definition above that the compatibility of a desired object is highly dependent on the position and orientation of the initial object.

Figure 2A:
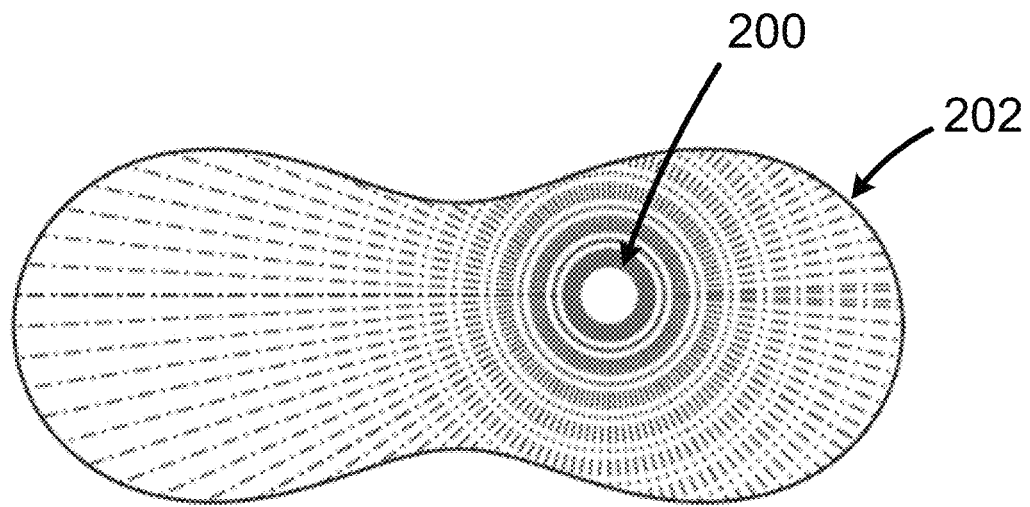
FIG. 2A shows one non-limiting example of a compatible desired object according to one aspect of the present disclosure.
Figure 2B:
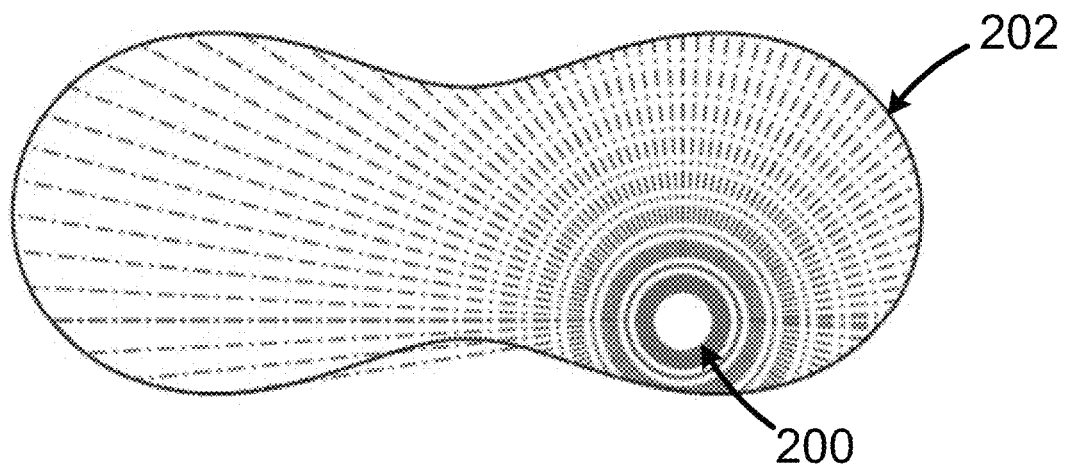
FIG. 2B shows one non-limiting example of a non-compatible desired object according to one aspect of the present disclosure.

FIGS. 2A and 2B highlight this linkage by providing two non-limiting examples with the same initial 200 and desired 202 objects. As shown in FIG. 2A, the desired object 202 is compatible. As shown in FIG. 2B, the desired object 202 is not compatible due to some outward-pointing normals intersecting the boundary of the desired object 202 multiple times.

The above-described assumptions prevent outward-pointing normal vectors of the boundary of the initial object from intersecting one another, and ensure that every outward-pointing normal will intersect the boundary of the desired object at exactly one point. Moreover, each point of intersection is unique and the set of all points of intersection recover the boundary of the desired object.

Variable offset curves can be formulated to generate layers for 2-D and/or 3-D objects. Therefore, the 2-D and 3-D formulations will be described in two sections below.

VOC 2-D Formulation

For the planar case, two $C^2$ functions are desired representing an initial and a desired object; however, in many practical applications curves are approximated by a discrete number of points. Therefore, given two ordered sets of points $U=\{\vec{u}_1, \vec{u}_2, \ldots \vec{u}_n\}$ and $V=\{\vec{v}_1, \vec{v}_2, \ldots \vec{v}_n\}$, piecewise parametric cubic splines can be used to generate the initial and the desired closed curves $Y_0$ and $Y_1$ with $Y_0$ being a proper subset of $Y_1$. It should be appreciated that the closed curves $Y_0$ and $Y_1$ may be approximated using other mathematical methodologies, for example a polynomial approximation, and that the use of piecewise parametric cubic splines is only one non-limiting example of the present disclosure. Each parametric spline is described as a cubic polynomial of the form:

$$\vec{X} = \vec{a} t_0^3 + \vec{b} t_0^2 + \vec{c} t_0 + \vec{d} \qquad (3)$$

where $\vec{X} = [x, y]^T \in R^2$, $\vec{a}$, $\vec{b}$, $\vec{c}$, $\vec{d}$ and are coefficients that uniquely describe the spline, and $t_0 \in [0,1)$ represents the interval on which the spline is valid. For the remainder of this section, superscripts will be appended to the spline coefficients (e.g., $\vec{a}^0$) to distinguish between the splines representing $Y_0$ and $Y_1$. Tangent vectors for $Y_0$ are calculated by taking the derivative of the cubic splines with respect to the parametric variable to.

$$\vec{T} = \frac{d\vec{X}}{dt_0} = 3\vec{a}^0 t_0^2 + 2\vec{b}^0 t_0 + \vec{c}^0 \qquad (4)$$

Normal vectors are derived by appending a zero to the tangent vector and taking the cross product with the appropriate unit vector that completes a right-handed frame.

$$\vec{N} = \begin{bmatrix} T_1 \\ T_2 \\ 0 \end{bmatrix} \times \begin{bmatrix} 0 \\ 0 \\ 1 \end{bmatrix} = \begin{bmatrix} T_2 \\ -T_1 \\ 0 \end{bmatrix} \qquad (5)$$

As stated above, outward-pointing normal vectors projected from convex objects do not intersect one another; therefore, parametric lines beginning on the boundary $Y_0$ and extending to $Y_1$ can be constructed of the form:

$$\vec{X}(1-t_1)\vec{X}_i + t_1 \vec{X}_f \qquad (6)$$

where $\vec{X} = [x, y]^T \in R^2$, $t_1 \in [0,1)$ represents the interval on which the line is valid, $\vec{X}$ represents a point on $Y_0$, and $\vec{X}_f$ represents a point along the normal projected from $Y_0$. To ensure that each parametric line is long enough to intersect $Y_1$, $\vec{X}_f$ is chosen such that $$\vec{X}_f = \vec{X}_i + r\underline{\vec{N}} \qquad (7)$$

where $$r = \max_m \|\vec{v}_m - \vec{X}_c\| + \frac{1}{2}\left(\max_n \|\vec{u}_n - \vec{X}_c\| - \min_n \|\vec{u}_n - \vec{X}_c\|\right) \qquad (8)$$

$\underline{N}$ is the two-dimensional representation of N with the z-component removed, and $\vec{X}_c$ is the centroid of the region enclosed by $y^0$.

By a suitable choice of r it can be guaranteed that each parametric line will intersect $Y_1$. The point of intersection is determined by first equating the parametric line and the spline representing $Y_1$ and then solving for the parametric variables. By separating the point of intersection into its scalar components, there are two equations in two independent variables.

$$(X_{f1} - X_{i1})t_1 + X_{i1} = a_1^1 t_0^3 + b_1^1 t_0^2 + c_1^1 t_0 + d_1^1 \qquad (9)$$

$$(X_{f2} - X_{i2})t_1 + X_{i2} = a_2^1 t_0^3 + b_2^1 t_0^2 + c_2^1 t_0 + d_2^1 \qquad (10)$$

Then $t_1$ is solved for in Equation 9, $$t_1 = \frac{a_1^1 t_0^3 + b_1^1 t_0^2 + c_1^1 t_0 + d_1^1 - X_{i1}}{X_{f1} - X_{i1}} \qquad (11)$$

and substitute $t_1$ into Equation 10 which results in the following cubic equation.

$$0 = (a_2^1 - ma_1^1)t_0^3 + (b_2^1 - mb_1^1)t_0^2 + (c_2^1 - mc_1^1)t_0 + (d_2^1 - md_1^1) + (m_{Xi1} - X_{i2}) \qquad (12)$$

The roots of Equation 12 correspond to the intersection of a spline with the parametric line. In practice there are m−1 splines and for a particular normal there are only two roots such that $t_0 \in [0,1)$. If $t_1$ if further restricted such that $t_1 \in [0,1)$, then there is only one valid root and the intersection point, $\vec{X}$, can be obtained by substituting to into Equation 3 or $t_1$ into Equation 6. Finally, the Euclidean distance between the point on the initial curve and the intersecting point on the desired curve can be calculated.

The process described above can be continued iteratively for each point in U and a single VOC is defined which is a bijective mapping of points on the initial curve to the desired curve. Individual layers can be generated by appropriate motion along vectors that originate on $Y_0$ and terminate on $Y_1$. For a given parametrized curve $\vec{x}_0(t_{x_0})$ and a desired number of layers $n_d$ each point on a subsequent layer $\vec{x}_i(t_{x_i})$ can be defined as $$\vec{x}_i(t_{x_i}) = \vec{x}_0(t_0) + i \frac{\|\vec{X}(\hat{x}_0(t_{x_0})) - (x_0(t_{x_0}))\|}{n_d} \vec{n}(t_{x_0}) \qquad (13)$$

where $i = \{1, 2, \ldots n_d\}$ and $\hat{X}(\hat{x}_0(t_{x_0}))$ is the point of intersection between the normal line emanating from $\hat{x}_0(t_{x_0})$ and the desired curve. A layer is then defined as the set of all points for a particular i and, as desired, when $i = n_d$ the desired curve can be recovered. When defined as described above, each layer is a VOC of the initial curve and the desired curve, but not a VOC of any of the intermediate layers, except when the initial and desired curves form an annular region.

VOC 3-D Formulation

The formulation for the 3-D case is similar to the 2-D case, described above; however, there are three differences. First, the set of points U and V can lie on a regular 3D grid. Second, the initial surface can be defined as a piecewise parametric bicubic patch and the desired surface can have an implicit representation. However, the initial and desired surfaces may be defined using another mathematical approximation, and the use of a piecewise parametric bicubic patch is but one non-limiting example of the present disclosure. Third, normal vectors can be extended to the 3-D case.

For the 3-D case, each parametric bicubic patch can be described as the tensor product between two different parametric cubic splines, $\vec{R}_1$ and $\vec{R}_2$. If $\vec{R}_1$ and $\vec{R}_2$ are defined as $$\vec{R}_1(u) = \vec{m}_1 u^3 + \vec{n}_1 u^2 + \vec{l}_1 u + \vec{o}_1 \qquad (14)$$

and $$\vec{R}_2(v) = \vec{m}_2 v^3 + \vec{n}_2 v^2 + \vec{l}_2 v + \vec{o}_2 \qquad (15)$$

then the bicubic patch can be given as $$\vec{X}(u, v) = \vec{R}_1(u)\vec{R}_2(v) = \sum_{i=0}^{3}\sum_{j=0}^{3} u^i v^j e_{ij} \quad (16)$$

where $\vec{X} = [x, y, z]^T \in \mathbb{R}^3$, $e_{ij}$ is the appropriate value for the multiplied coefficients from $\vec{R}_1$ and $\vec{R}_2$, and $u, v \in [0,1)$ represents the interval on which the bicubic patch is valid.

Tangent vectors to the parametric surface can be calculated by taking the partial derivatives of the bicubic patches $$\vec{T}_1 = \frac{\partial \vec{X}}{\partial u} = \left[\frac{\partial x}{\partial u}, \frac{\partial y}{\partial u}, \frac{\partial z}{\partial u}\right]^T \quad (17)$$

and $$\vec{T}_2 = \frac{\partial \vec{X}}{\partial v} = \left[\frac{\partial x}{\partial v}, \frac{\partial y}{\partial v}, \frac{\partial z}{\partial v}\right]^T. \quad (18)$$

Normal vectors can be derived by taking the cross product of the tangent vectors in the order that preserves a right-handed frame, i.e. $\vec{N} = \vec{T}_1 \times \vec{T}_2$. The intersection of the normal vector from the initial surface with the desired surface can be calculated by substituting the coordinates of the parametric line into the implicit equation and then solving the resulting polynomial for the parameter of interest.

Layer Generation using Laplace's Equation

In another non-limiting example, an additive manufacturing method includes generating layers using solutions to Laplace's equation and printing the layers conformally about an object's natural boundary. The method using solutions to Laplace's equation can be used to create layers for non-convex objects in both two and three dimensions. The layers can be defined as modified solutions to Laplace's equation, existing between initial and desired curves or surfaces.

Laplace's equation is a second-order partial differential equation (PDE) of the form $$\nabla^2 \varphi = \nabla \varphi = 0. \quad (19)$$

Any function, $\varphi$, that is at least twice continuously differentiable and satisfies Laplace's equation is called a harmonic function. Harmonic functions have several desirable properties, but two are of particular interest.

The first property is a corollary of the maximum principle, which states that if a function $\psi$ is harmonic in a domain D and continuous in the closure of D, then both the maximum and the minimum values of the function in the closure of D are attained on the boundary. Furthermore, it can be shown that a harmonic function, or solution to Laplace's equation, is completely determined by its boundary values. A consequence of this fact is that only two inputs (i.e. the initial and desired curves or surfaces) can be required to completely define and solve the problem of generating layers. Moreover, since the maximum and minimum values of a harmonic function must be attained on the boundary and the initial and desired boundaries can be defined to have uniform, but different, potentials, the solution between the initial and desired boundaries can be completely constrained. Additionally, $\psi$ can be bound from above and below by choosing appropriate values for the initial and desired boundaries. Further still, w is continuous throughout the domain, and then there exists a continuum of closed equipotential curves or surfaces between the two boundaries.

The second property is that the gradient at any point of an equipotential curve or surface is orthogonal to the boundary. The gradient of a scalar function $f(\vec{x})$ can be defined as $$\nabla f(\vec{x}) \Box \vec{u} = D_{\vec{u}} f(\vec{x}) \quad (20)$$

or equivalently the gradient of $f(\vec{x})$ is the vector field whose dot product with any vector $\vec{u}$ at each point $\vec{x}$ results in the directional derivative of $f(\vec{x})$ in the direction $\vec{u}$. The directional derivative at an arbitrary point $\vec{p}$ in the direction of $\vec{v}$ on an equipotential boundary $f(\vec{x})$ can be defined as $$D_{\vec{v}} f(\vec{x}) = \left[\frac{d}{d\alpha} f(\vec{x} + \alpha \vec{v})\right]_{\alpha=0} \quad (21)$$

and the directional derivative will be necessarily zero along a tangential direction on the equipotential boundary. In 3-D Euclidean space, there are two orthogonal tangent vectors for every point on the equipotential surface. These two vectors form a tangent plane where the dot product of the gradient with an arbitrary vector in the tangent plane must be identically zero. The only nontrivial solution is for the gradient to be orthogonal to the tangent plane or, in other words, normal to the surface. This result can also be generalized for 2-D Euclidean space.

The gradient of $\psi$ results in a potential field, existing solely in the domain D, which is unique at every point. Given a point on the initial boundary and the potential field, the potential field lines can be constructed which extend to the desired boundary by integrating. These potential field lines, originating from different points, do not intersect in the domain. As a proof, assume that two arbitrary potential lines originating from two different points on the initial boundary intersect in the domain at some equipotential boundary. As described above, the gradient at a point on an equipotential boundary is always normal to the boundary. Therefore, after these two potential lines intersect at an arbitrary equipotential boundary they will follow the same path until they terminate on the desired boundary. Since the two intersecting equipotential boundaries were chosen arbitrarily, it must hold for all equipotential boundaries including the initial boundary. Thus, the two potential lines are the same and must have originated from the same point on the initial boundary, which is a contradiction.

With this last property, uniformly partitioned layers between an initial and desired boundary can be constructed.

Laplace Formulation

On 3-D Euclidean space, Laplace's equation is given by $$\nabla^2 \varphi(x, y, z) = \left(\frac{\partial^2}{\partial x^2} + \frac{\partial^2}{\partial y^2} + \frac{\partial^2}{\partial z^2}\right) \varphi(x, y, z) = 0 \quad (22)$$

where $\varphi(x,y,z)$ is a scalar harmonic function representing a potential field. To solve the PDE in Equation 22, boundary conditions can be applied. Therefore, the initial and desired potential surfaces can be treated as boundaries and the interior between the two surfaces can be treated as free space. Since potential flows from areas of high potential to areas of low potential and the deposited layers can evolve outward from the initial surface, the potential on the initial surface can be set to an arbitrary positive value and the potential on the desired surface can be set to zero.

Upon solving Equation 22, a harmonic function describing the potential between the initial and desired surfaces can be obtained. By taking the gradient of the resulting harmonic function, the potential field between the two surfaces can be determined, and, by integrating, the potential field line can be generated. Due to the nature of Laplace's equation, the equipotential surfaces are not uniformly partitioned and do not lend themselves well to material deposition. This issue can be overcome by rep arameterizing the potential field lines extending between the initial and desired surface by arc length.

If each potential field line is only known for a discrete set of points (as is generally the case for numerical solutions), then a continuous curve can be formed by interpolating with piecewise parametric cubic splines. It should be appreciated that interpolation for a continuous curve can be formed using other mathematical methodologies, for example a polynomial approximation, and that the use of piecewise parametric cubic splines is only one non-limiting example of the present disclosure. A specific point along the curve can then be represented as $$\vec{X}(s) = \vec{a}^3 s^3 + \vec{b}^3 s^2 + \vec{c}^3 s + \vec{d}^3 \tag{23}$$

where $\vec{X} \in R^2$ for the planar case and $\vec{X} \in R^3$ for the 3-D case, s is the arc length at that specific point, and $\vec{a}^3$, $\vec{b}^3$, $\vec{c}^3$, and $\vec{d}^3 \in R^3$ are parameters that uniquely define each potential field line.

The spacing between each layer can be calculated by dividing the total arc length of each potential field line by the desired number of deposited layers, $n_d$. Each layer can be defined as $$L_j = \left\{ \vec{X}_k \left( \frac{j s_k}{n_d} \right) \right\} \tag{24}$$

where $j = \{0, 1, \ldots, n_d\}$, $k = \{1, 2, \ldots, n_f\}$, $n_f$ is the number of potential field lines, $S_k$ is the total arc length of the kth potential field line, and $$\vec{X}_k \left( \frac{j s_k}{n_d} \right)$$

is the kth point of the set evaluated at a fractional portion of the arc length dependent on the current layer. By using Equation 24 above, $L_0$, is the initial boundary, $L_{n_d}$ is the desired boundary, and each intermediate surface $L_j$ will be uniformly spaced throughout the medium.

Voids

One benefit of the above-described conformal AM processes is the ability to create hollow features, or voids. Thus, the additive manufacturing methods described above (i.e., either the VOC or Laplace's equation methods) may be used to generate layers for a volume without hollow features and then the formulation, described below, may be used then be used to generate local deformations that force the layers around the feature.

Void Formulation

Although the 2D formulation of the additive manufacturing method to create voids will be described below, it should be appreciated that the method may be easily extended to 3D by applying the appropriate changes outlined in the 3D VOC formulation, described above. First, given a set of ordered points $O_i = \{\vec{o}_{i1}, \vec{o}_{i1}, \ldots, \vec{o}_{in}\}$ that represents the vertices of i hollow features, a geometric center $O_{C_i}$ of each feature may be determined as:

$$O_{C_i} = \frac{1}{n} \sum_{j=1}^{n} \vec{o}_{ij} \tag{25}$$

where n is the number of points representing each feature. Then, the hollow feature, or void, can by dilated by shifting the center to the origin (through a rigid body transformation) and scaling each point by a set factor, for example 1.5, and then shifting back to the original geometric center. This dilated feature may be used to create a local area of effect (AOE), where points within the area are altered and those outside remain unchanged. Next, both the hollow feature and its dilated representation can be approximated as closed curves using piecewise parametric cubic splines following the process outlined in the 2D VOC formulation, described above. It should be appreciated that the hollow feature and/or its dilated representation may be approximated using other mathematical methodologies, for example a polynomial approximation, and that the use of piecewise parametric cubic splines is only one non-limiting example of the present disclosure.

If a point is determined to be within the AOE, the smallest distance from the geometric center of the hollow feature to its boundary and to the boundary of the dilated feature, along a line containing the point of interest, can be calculated using the intersection method outlined in the 2D VOC formulation, described above. These distances are then used in a parametric line equation to scale the original point to some location between the boundary of the hollow feature and the dilated boundary. The scaling factor can be calculated as:

$$s = d_{hf}(1-t_2) + t_2 d_{df} \tag{26}$$

where $d_{hf}$ is the distance to the hollow feature, $d_{df}$ is the distance to the dilated feature, and $t_2$ is the ratio of the distance from the center of the hollow feature to the point of interest and the distance to the dilated feature. Each point $p_i$ in the AOE is then transformed by:

$$P_i = s \frac{p_i}{d} \tag{27}$$

where d is the distance from the geometric center of the hollow feature to the point. Intuitively, this transformation moves a point at the geometric center to the boundary of the hollow feature and leave points on the dilated boundary unchanged. Points in between these two boundaries are shifted along the line that originates at the geometric center and contains the point of interest.

As currently formulated, the behavior for a point located at the exact geometric center is undefined. For this case, the fact that these sets of points are, in fact, individual layer can be leveraged. First, the two adjacent points in the layer can be transformed. Then, a line $l_1$ can be created between the two points and, finally, the point at the geometric center can be shifted to the boundary of the hollow feature along the line that bisects h. Another possible concern is when the hollow feature intersects or is tangent to the boundary of the initial object. For this case, any point that is transformed inside of the boundary of the initial object is discarded and no longer part of the layer.

A final concern of interest is when one point exists within multiple AOEs for different hollow features. This issue may be overcome by implementing a method relying on interpolation. For each layer, the first and last point can be identified that, when transformed, can be located inside of the overlapping AOE. These points and their adjacent points (that remained outside of the AOE) can then be used as control points during the interpolation. The untransformed points between the control points may then be interpolated over to complete the layer. It should be appreciated that any mathematical interpolation algorithm may be implements, and, in particular, a shape-preserving interpolation algorithm.

INDUSTRIAL APPLICABILITY

Figure 3:
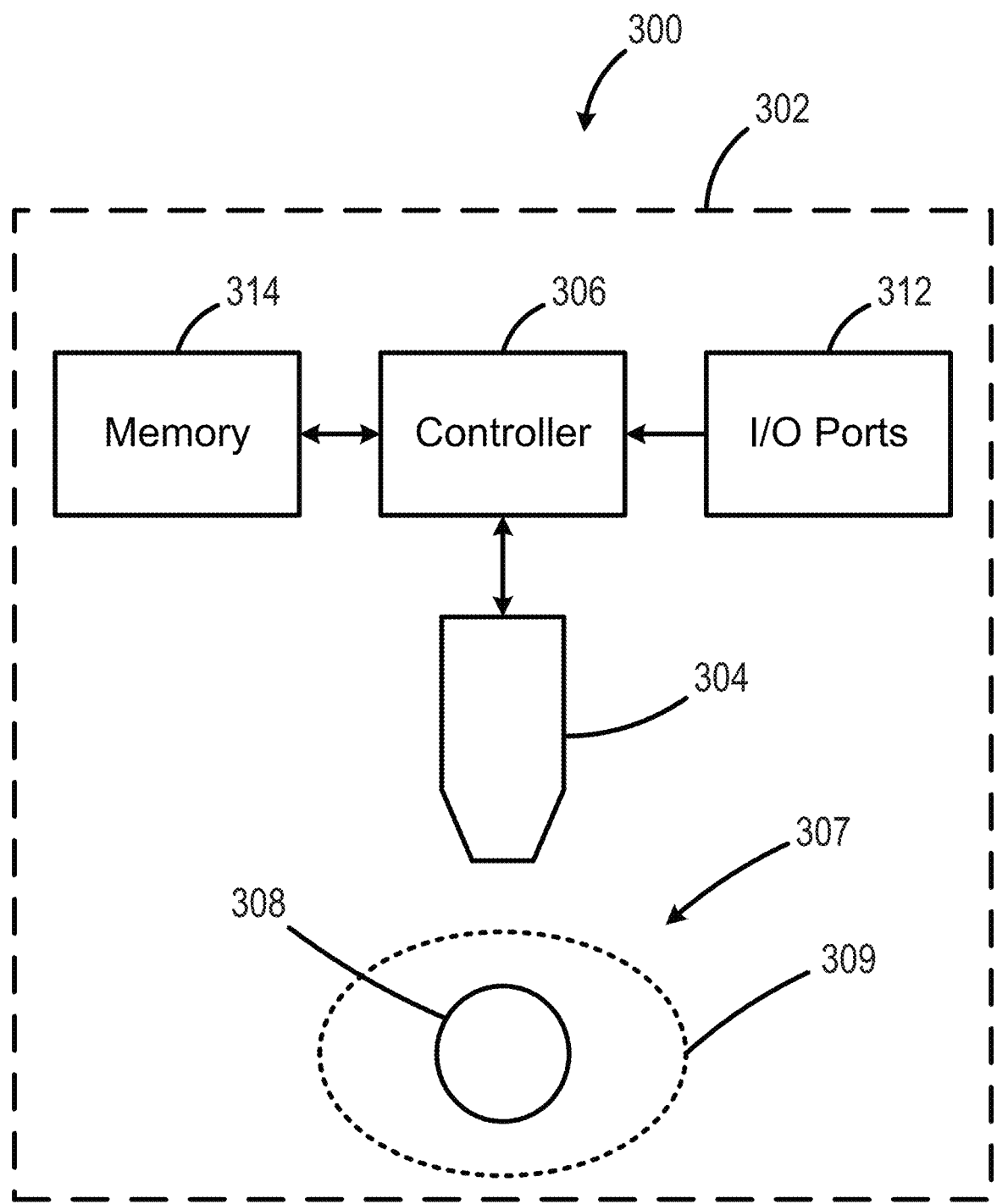
FIG. 3 is a schematic illustration of a printing system configured to implement a printing process according to one aspect of the present disclosure.

The above described methods (i.e. VOCs and Laplace's equation) may be implemented into a printing system to enable conformal additive manufacturing of, or onto, an object. FIG. 3 shows a non-limiting example of one such system 300 for performing additive manufacturing. The system 300 can include a printing system 302 having a print head 304 in communication with a controller 306 and configured to deposit material onto an object 307 between an initial boundary 308 and a desired boundary 309. The system 300 can support the object 307 by any known mechanism, for example, by directly mounting or grasping the object 307. The specific mechanism used to secure the object 307 is not meant to be limiting in any way. Also, the illustrated shape of the object 307 is not meant to be limiting in any way as many different shapes for the initial boundary 308 and the desired boundary 309 are possible, as described above.

The print head 304 can be coupled to a mechanical linkage (not shown) capable of positioning the print head 304 in any location in a 3-D coordinate system defined around the object 307. The positioning of the print head 304 can be controlled by the controller 306. The material deposited by the print head 304 can be a polymer, a metal, glass, sands, waxes, paper, or any other material known in the art or developed in the future. The controller 306 can be in communication with I/O ports 312 and a memory storage device 314.

Figure 4:
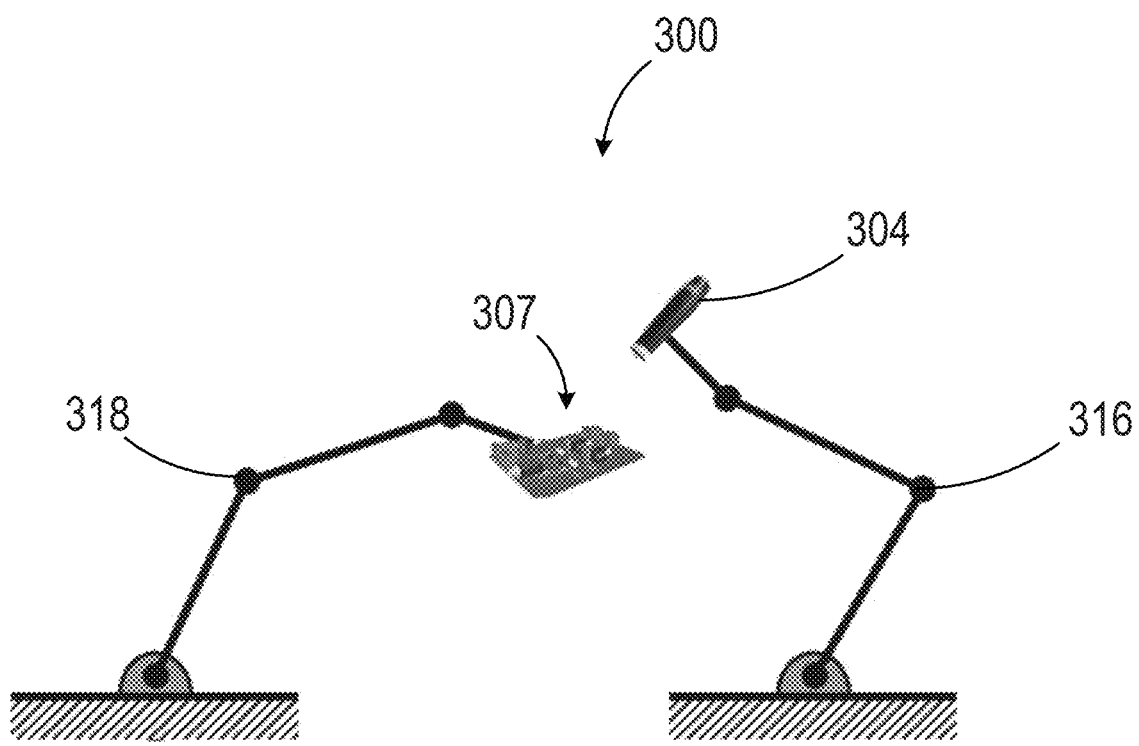
FIG. 4 is a schematic illustration of an articulated configuration of the printing system of FIG. 3.

Alternatively or additionally, the mechanical linkage coupled to the print head 304 can take the form of a print head articulation mechanism 316 and the object 307 can be coupled to a build object articulation mechanism 318, as shown in FIG. 4. The print head articulation mechanism 316 can be instructed by the controller 306 to direct the print head 304 to any desired position and/or orientation within a range of motion of the print head articulation mechanism 316. Similarly, the build object articulation mechanism 318 can be instructed by the controller 306 to direct the object 307 to any desired position and/or orientation within a range of motion of the build object articulation mechanism 318. In this non-limiting example, the object 307 being printed on by the print head 304 is not required to be flat as the controller 306 can reorient the print head 304 via the print head articulation mechanism 316 and/or the object 307 via the build object articulation mechanism 318, as desired.

Figure 5:
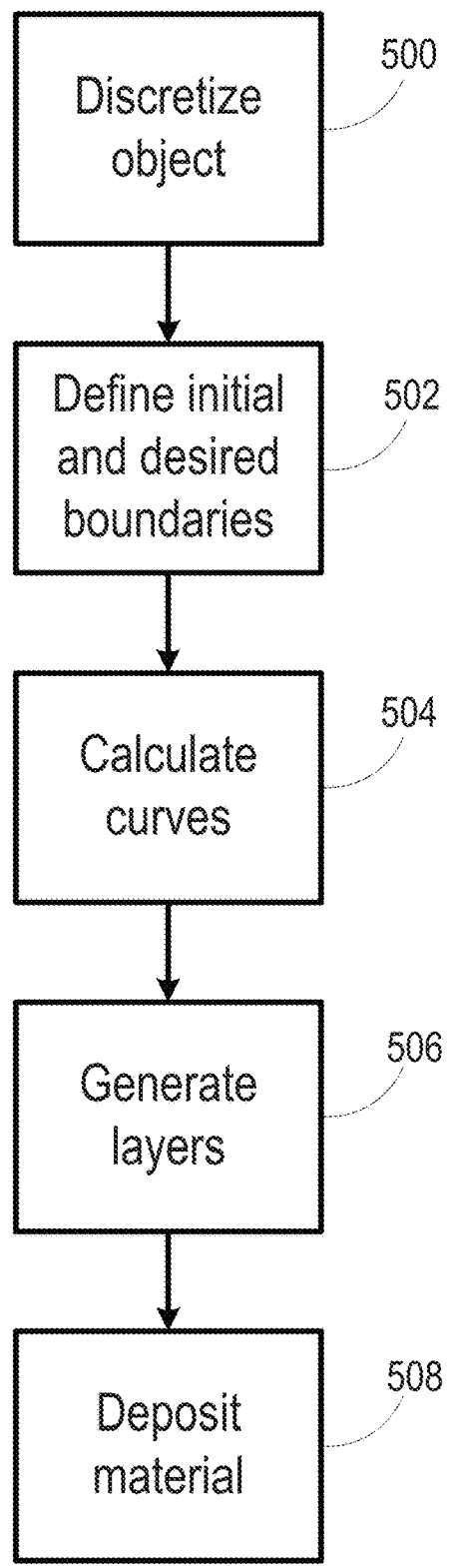
FIG. 5 is a block diagram illustrating some examples of steps for conformally printing an object using the printing system of FIG. 3 according to one aspect of the present disclosure.

One non-limiting example of the operation of the system 300 will be described below with reference to FIGS. 3-5. As shown in FIG. 5, initially, an object can be discretized (i.e., approximated into a series of discrete points) at step 500.

The object can be an existing part to be printed on, or a new part to be printed. The discretization of the object to be printed, or printed on, can be carried out by the controller 306. Once the object is discretized, the controller 306 can be configured to define an initial boundary and a desired boundary at step 502. Alternatively or additionally, the initial boundary and the desired boundary may be inputs to the controller 306. The initial boundary may be represented by an initial shape or structure of the object or a portion of the object. The desired boundary may represent a desired shape or structure of the object after printing the object or printing onto the object. The initial and desired boundaries may be defined by a curve(s) or surface(s), as described above in the 2D and 3D VOC formulations. Alternatively or additionally, the initial and desired boundaries may be defined by a curve(s) or surface(s), as described above in the Laplace's equation formulation.

After the initial and desired boundaries are defined at step 502, the controller 306 can be configured to calculate a plurality of curves at step 504 which extend from the initial boundary and intersect the desired boundary. The plurality of curves may be calculated by the controller 306 using the 2D or 3D VOC formulation, described above, Alternatively or additionally, the controller 306 may be configured to calculate the reparametrized potential field lines using the Laplace's equation formulation, described above. With the plurality of curves calculated at step 504, a plurality of layers can be generated conformally between the initial and desired boundaries at step 506. With the plurality of curves calculated, points at pre-determined distances along the curves between the initial and desired boundaries can be used to map the plurality of layers conformally. In one non-example using the VOC formulation, the plurality of layers are VOCs of the initial and desired boundaries. Once the plurality of layers are generated at step 506, the controller 306 can be configured to instruct the print head 304 to deposit material to print the object or print onto the object conformally at step 508 in the plurality of layers generated at step 506.

Thus, the above described systems and methods enable conformal additive manufacturing of, or onto, an object. For example, the above described system and methods may enable a printing system to print onto 2D or 3D surfaces, print parts with fully enclosed voids, adjust material properties by adjusting a pattern of deposition, print onto existing parts and/or surfaces, compensate for environmental perturbations during the deposition process, and/or print small voids that influence structural properties and failure modes of a part.

EXAMPLES

The above described conformal printing methods were simulated to verify their efficacy. The results of the simulations will be described with reference to the figures.

Figure 6:
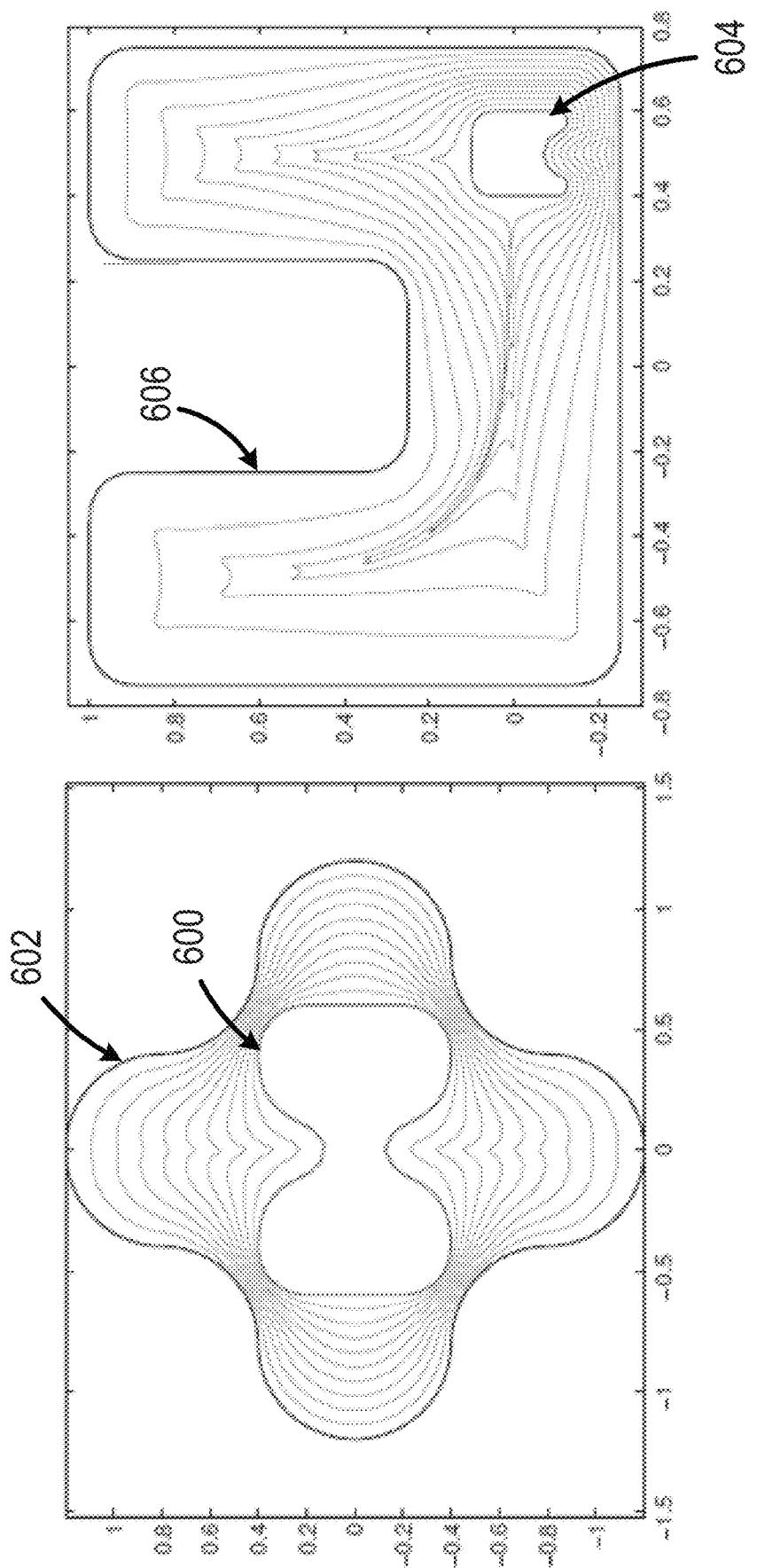
FIG. 6A shows layers generated using a manipulated solution to Laplace's equation for a co-located, non-convex desired object.
FIG. 6B shows layers generated using a manipulated solution to Laplace's equation for an off-center, non-convex desired object.
Figure 7:
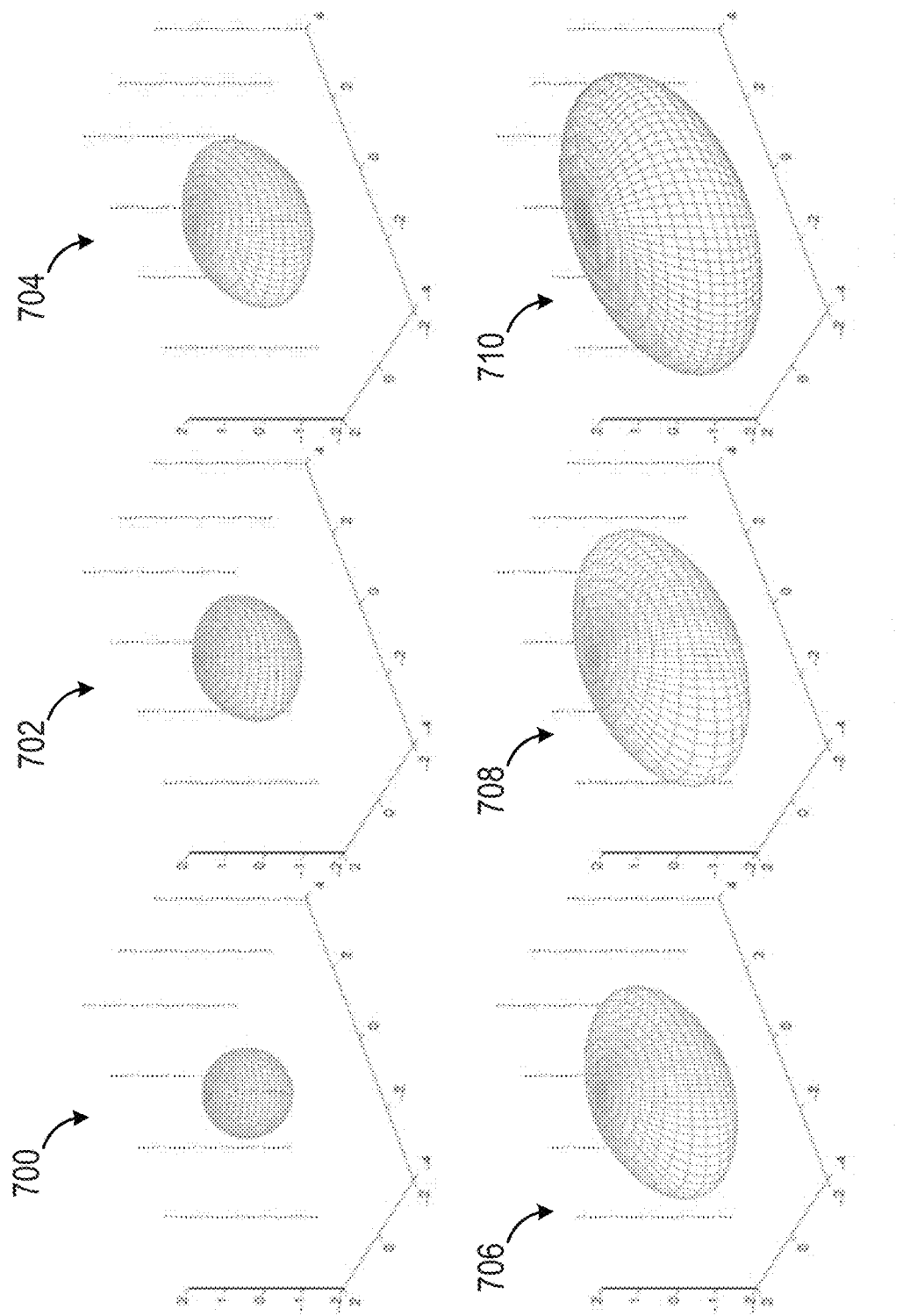
FIG. 7 shows five layers deposited onto an initial 3-D object where the layers were generated using variable offset surfaces according to one aspect of the present disclosure.
Figure 8:
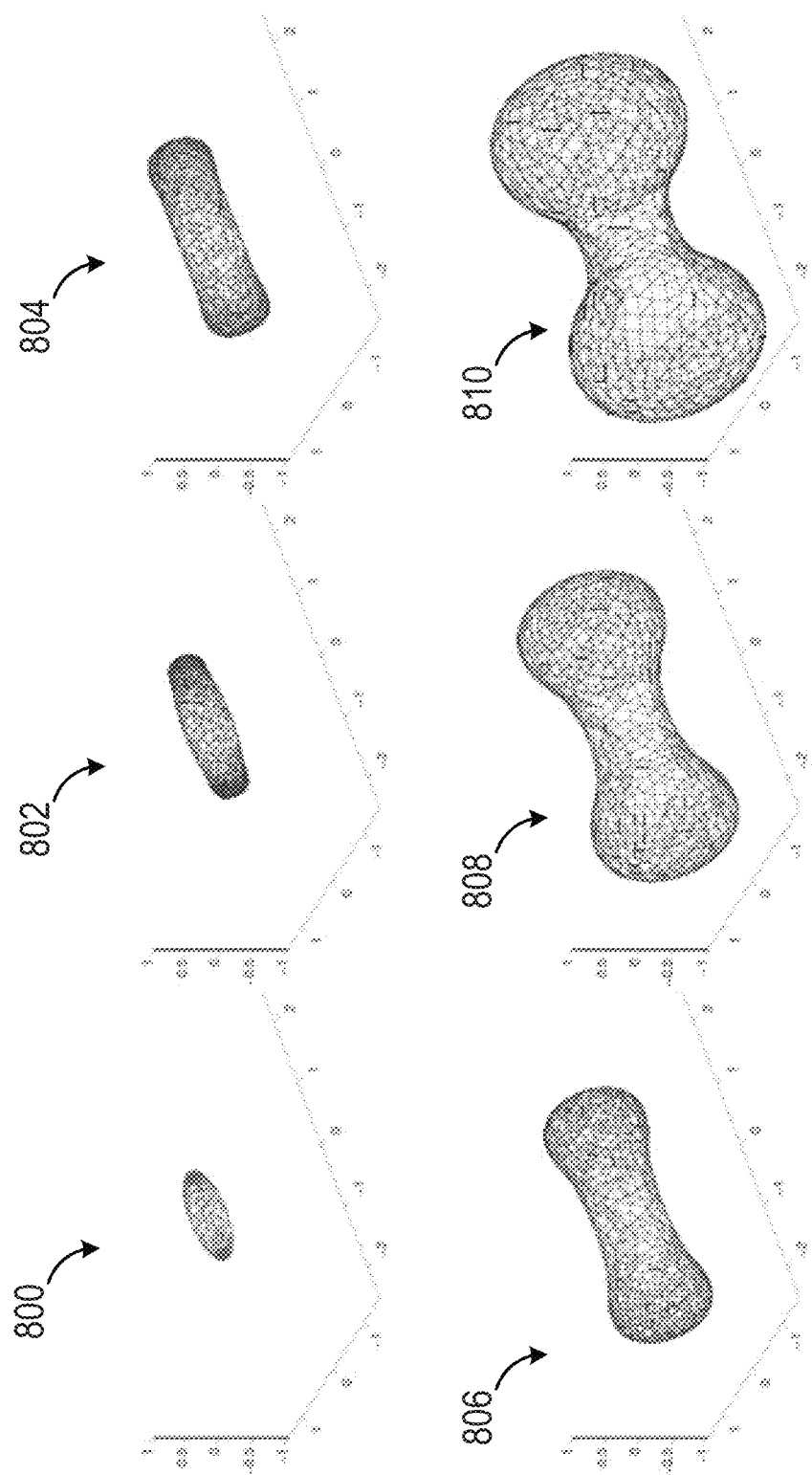
FIG. 8 shows five layers deposited onto an initial 3-D object where the layers were generated using a manipulated solution to Laplace's equation according to another aspect of the present disclosure.

First, each method was used for layer deposition on arbitrary 2-D and 3-D geometric objects. One advantage of generating layers using the solution to Laplace's equation is highlighted by depositing ten layers between arbitrary, planar, non-convex desired objects as shown in FIGS. 6A and 6B. FIG. 6A shows ten layers generated between an initial boundary 600 and a desired boundary 602 for co-located non-convex objects. FIG. 6B shows ten layers generated between an initial boundary 604 and a desired boundary 606 for off-center non-convex objects. The deposition of layers onto 3-D objects using both VOCs and the solution to Laplace's equation is shown in FIG. 7 and FIG. 8. As shown in FIG. 7, five layers of deposition are applied to a sphere to form a larger ellipsoid using VOCs. In particular, the graph 700 shows an initial boundary for a sphere. The graphs 702-708 illustrate the first, second, third, and fourth layers applied to the initial boundary of graph 700, respectively. Lastly, the graph 710 shows the final layer, or desired boundary, of the ellipsoid. As shown in FIG. 8, five layers of deposition are applied to an ellipsoid to form a larger non-convex surface using the solution to Laplace's equation. In particular, the graph 800 shows an initial boundary for an ellipsoid. The graphs 802-808 illustrate the first, second, third, and fourth layers applied to the initial boundary of graph 800, respectively. Lastly, the graph 810 shows the final layer, or desired boundary, of a larger non-convex "dumbbell-shaped" surface.

In the non-limiting examples shown in FIG. 7 and FIG. 8, only five layers were deposited resulting in large geometric disparities between the layers. Most commercial AM processes can produce layer thicknesses of 0.150 millimeters or less, while consumer grade AM processes can typically produce layer thicknesses of 0.2 millimeters or less. In practice, the number of layers may be chosen to match the layering resolution of the AM process. Specifically, the maximum normal distance between any two layers can be defined as less than the layer resolution of the AM process.

Figure 9A:
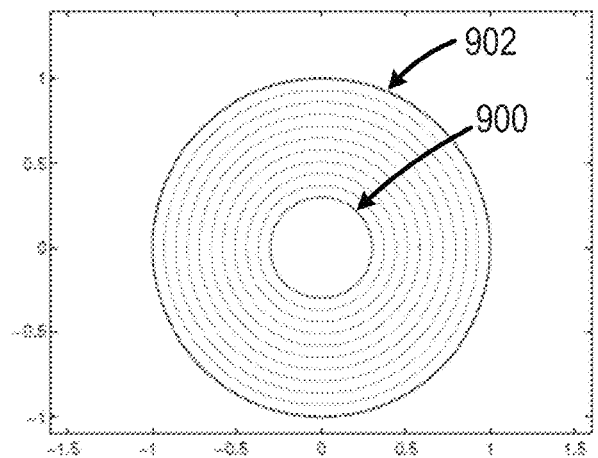
FIG. 9A shows ten layers generated for an annulus using variable offset curves.
Figure 9B:
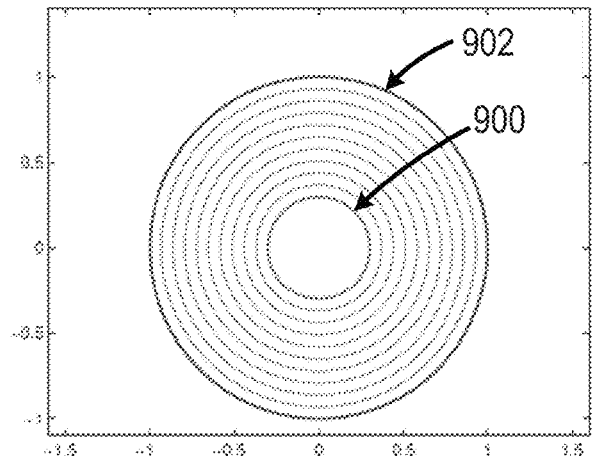
FIG. 9B shows ten layers generated for an annulus using a manipulated solution to Laplace's equation.

The method using the solution to Laplace's equation was formulated for non-convex objects; however, it can also generate layers for convex and compatible desired objects. The VOC and the Laplace's equation methods were compared by generating 10 layers for planar convex and compatible desired objects. For the convex case, two objects were tested. First, layers for an annulus between an initial boundary 900 and a desired boundary 902 are shown in FIG. 9A using the VOC method and in FIG. 9B using the Laplace's equation method. Then, layers for an ellipse with a circular cutout between an initial boundary 1000 and a desired boundary 1002 are shown in FIG. 10A using the VOC method and 10B using the Laplace's equation method.

Figure 10A:
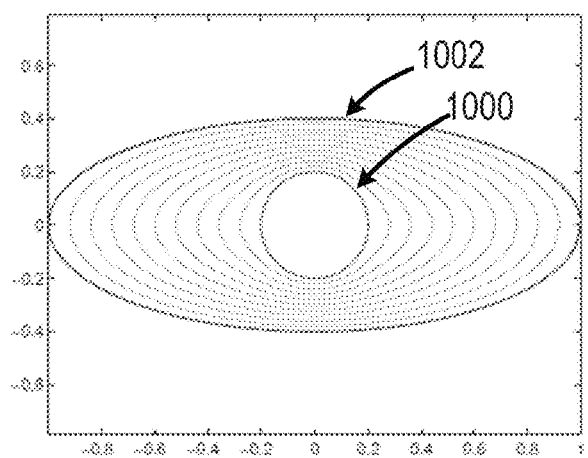
FIG. 10A shows ten layers generated for an ellipse with a circular cutout using variable offset curves.
Figure 10B:
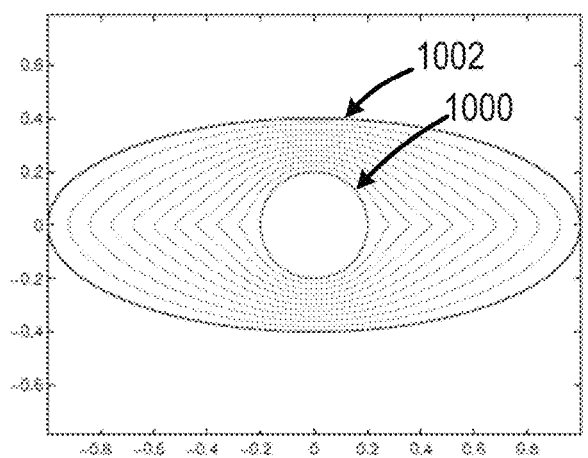
FIG. 10B shows ten layers generated for an ellipse with a circular cutout using a manipulated solution to Laplace's equation.

As shown in FIGS. 9A, 9B, 10A, and 10B, the results clearly display that both methods produce the same results for the annulus (FIGS. 9A and 9B), but not for the ellipse (FIGS. 10A and 10B). As described above, solutions to Laplace's equation require that equipotential surfaces intersect the potential field perpendicularly. Since the initial boundary and desired boundary are still considered equipotential curves, the field lines must intersect both curves perpendicularly. In the case of the annulus shown in FIGS. 9A and 9B, normal lines from the initial boundary 900 are also normal lines of the desired boundary 902. Therefore, the solutions to both methods are equivalent. The results from the second case, shown in FIGS. 10A and 10B, confirm this notion, especially along the semi-major axis of the ellipse. Each layer generated by the VOC method (FIG. 10A) is a minimum of $C^1$ continuous, while only some of the layers from the Laplace's equation method (FIG. 10B) are $C^1$ continuous. Interestingly, if the layers from both methods are superimposed over one another, the layers exactly overlap on the semi-major and semi-minor axes. As before, these locations are where the normal lines from both boundaries 1000 and 1002 are the same.

For the compatible desired object case, an ellipse was selected as the initial boundary 1100 and an adaptation of a "plus" sign was chosen for the desired boundary 1102. The layers for the VOC method are shown in FIG. 11A, and the layers for the Laplace's equation method are shown in FIG. 11B.

Similar to the results shown in FIGS. 10A and 10B, the layers generated in FIGS. 11A and 11B for the compatible case are not identical for the two methods. Since the VOC method can be limited to convex initial boundaries, there may be no instance where a compatible desired boundary will share all its normal lines with the initial boundary. Therefore, there may not be a compatible object (that is not convex) where both methods will produce the same results. However, it should be appreciated that both methods accomplish the goal of conformally generating layers between the initial boundary and the desired boundary. It should also be appreciated that although the comparisons of FIGS. 9A-11B were completed for two-dimensional objects, the same results would apply for three-dimensional objects due to the underlying properties of the formulations above.

As described above, one of the possible benefits of conformal AM is the ability to create hollow features, or voids, without the need for sacrificial support material. Since a methodology for the VOC and the Laplace's equation methods may be similar, the 2D examples described below will only be applied to the VOC method, while the 3D example will be applied to the Laplace's equation method. FIGS. 12A-14B provide three, 2D examples of layer generation using the VOC method from an initial ellipse 1200 to a desired star-shape 1202 with a different number of hollow features, or voids. In particular, FIGS. 12A and 12B show layers generated around a single hollow feature 1204, FIGS. 13A and 13B show layers generated around multiple hollow features 1300, and FIGS. 14A and 14B show layers generated around overlapping hollow features 1400. From FIGS. 12A-14B, one of skill in the art would appreciate that the VOC and the Laplace's equation methods are able to conformally generate layers around various different types of hollow features.

Figure 15:
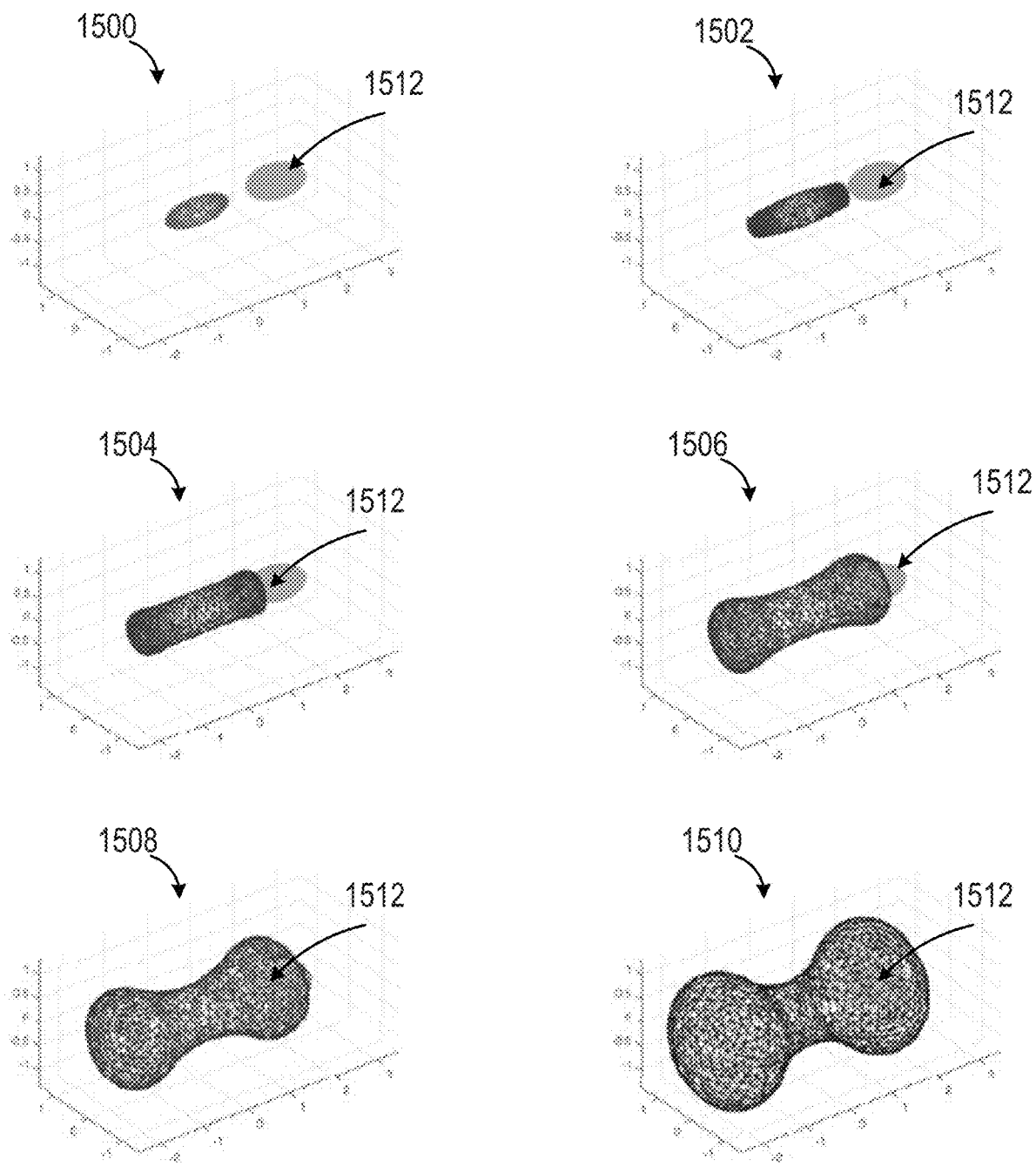
FIG. 15 shows five layers deposited onto a desired 3-D object having an ellipsoidal hollow feature where the layers were generated using a manipulated solution to Laplace's equation according to another aspect of the present disclosure.

As described above, each of the 2D examples of FIGS. 12A-14B generalize to the 3D case and to the Laplace's equation method. FIG. 15 shows the generated layers for the same initial boundary (graph 1500) and desired boundary (graph 1510) used in FIG. 8 with the addition of a single, hollow ellipsoid feature 1512. During the layer generation illustrated in the graphs 1500-1510 of FIG. 15, the layers evolve from the initial geometric object (an ellipsoid, shown in graph 1500) to the desired object (a dumbbell shown in graph 1510), but beginning with the second layer (graph 1504) the behavior is markedly different that the example of FIG. 8. In the graph 1504, the layers initially contract away from the hollow feature 1512. But, as the untransformed layers transition past the centroid of the hollow ellipsoid 1512 as in graph 1508, the transformed layers envelop the remainder of the hollow feature 1512. Once past the AOE of the hollow feature 1512, as in graph 1510, the layer generation behavior again is similar to that of FIG. 8.

Thus, while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

We claim:

1. A method for additive manufacturing of an object comprising:

defining, by a controller, an initial three dimensional boundary of the object;

defining, by the controller, a desired three dimensional boundary for a desired object,
the desired three dimensional boundary having a different shape than the initial three dimensional boundary, and
the initial three dimensional boundary being fully contained inside the desired three dimensional boundary;
calculating, by the controller and based on the desired three dimensional boundary having a different shape than the initial three dimensional boundary:
a plurality of curves that extend between the initial three dimensional boundary and the desired three dimensional boundary, and
spacing between each curve of the plurality of curves;
instructing, by the controller, one or more of a print head or an object articulation mechanism to be directed to a first set of positions in a three dimensional space and a first set of orientations to deposit a first layer of material conformally around the initial three dimensional boundary,
the print head being normal to a first curve of the plurality of curves, corresponding to the initial three dimensional boundary when depositing the first layer of material conformally around the initial three dimensional boundary;
instructing, by the controller, one or more of the print head or the object articulation mechanism to be directed to a second set of positions in the three dimensional space and a second set of orientations to deposit one or more second layers of the material conformally around the first layer of the material,
the print head being normal to one or more second curves of the plurality of curves, when depositing the one or more second layers of the material conformally around the first layer of the material; and
instructing, by the controller, one or more of the print head or the object articulation mechanism to be directed to a third set of positions in the three dimensional space and a third set of orientations to deposit a third layer of the material conformally around an outermost layer of the one or more second layers of the material to form the desired object,
the print head being normal to a third curve, of the plurality of curves, corresponding to the outermost layer of the one or more second layers of the material when depositing the third layer of the material corresponding to the desired three dimensional boundary.

2. The method of claim 1, wherein each of the plurality of curves define a variable offset curve of the initial three dimensional boundary and the desired three dimensional boundary.

3. The method of claim 1, wherein the initial three dimensional boundary includes a convex or a desired compatible object.

4. The method of claim 1, wherein the initial three dimensional boundary is an initial curve and the desired three dimensional boundary is a final curve.

5. The method of claim 1, wherein the initial three dimensional boundary is an initial surface and the desired three dimensional boundary is a final surface.

6. The method of claim 1, wherein calculating the plurality of curves that extend between the initial three dimensional boundary and the desired three dimensional boundary comprises:

calculating tangent vectors for each point on the initial three dimensional boundary;
deriving normal vectors from the tangent vectors for each point on the initial three dimensional boundary; and
determining an intersection between the normal vectors and the desired three dimensional boundary.

7. The method of claim 2, wherein each variable offset curve of the plurality of curves is defined as a bijective mapping of points on the initial three dimensional boundary to the desired three dimensional boundary.

8. The method of claim 1, wherein at least one void is created between the initial three dimensional boundary and the desired three dimensional boundary via the one or more second layers of the material.

9. The method of claim 1, wherein each of the plurality of curves are defined by potential field lines reparameterized by arc length between the initial three dimensional boundary and the desired three dimensional boundary calculated using a manipulated solution to Laplace's equation.

10. The method of claim 1, wherein a potential defined by the initial three dimensional boundary is a positive value and a potential defined by the desired three dimensional boundary is zero.

11. The method of claim 1, wherein calculating the plurality of curves that extend between the initial three dimensional boundary and the desired three dimensional boundary comprises:

defining a harmonic function describing a potential between the initial three dimensional boundary and the desired three dimensional boundary;
calculating a gradient of the harmonic function to determine a potential field between the initial three dimensional boundary and the desired three dimensional boundary; and
integrating to determine potential field lines between the initial three dimensional boundary and the desired three dimensional boundary.

12. A system for additive manufacturing of an object comprising:
a print head configured to deposit material onto the object;
a controller configured to:
define an initial three dimensional boundary of the object;
define a desired three dimensional boundary for a desired object,
the desired three dimensional boundary having a different shape than the initial three dimensional boundary, and
the initial three dimensional boundary being fully contained inside the desired three dimensional boundary;
calculate, based on the desired three dimensional boundary having a different shape than the initial three dimensional boundary:
a plurality of curves that extend between the initial three dimensional boundary and the desired three dimensional boundary, and
spacing between each curve of the plurality of curves;
instruct the print head to be directed to a first set of positions in a three dimensional space and a first set of orientations to deposit a first layer of the material conformally around the initial three dimensional boundary,
the print head being normal to a first curve, of the plurality of curves, corresponding to the initial three dimensional boundary when depositing the first layer of material conformally around the initial three dimensional boundary;

instruct the print head to be directed to a second set of positions in the three dimensional space and a second set of orientations to deposit one or more second layers of the material conformally around the first layer of the material, the print head being normal to one or more second curves of the plurality of curves, when depositing the one or more second layers of the material conformally around the first layer of the material; and instruct the print head to be directed to a third set of positions in the three dimensional space and a third set of orientations to deposit a third layer of the material conformally around an outermost layer of the one or more second layers of the material to form the desired object, the print head being normal to a third curve, of the plurality of curves, corresponding to the outermost layer of the one or more second layers of the material when depositing the third layer of the material corresponding to the desired three dimensional boundary.

13. The system of claim 12, wherein each of the plurality of curves define a variable offset curve of the initial three dimensional boundary and the desired three dimensional boundary.

14. The system of claim 12, wherein each of the plurality of curves are defined by potential field lines reparameterized by arc length between the initial three dimensional boundary and the desired three dimensional boundary calculated using a manipulated solution to Laplace's equation.

15. The system of claim 12, wherein at least one void is created between the initial three dimensional boundary and the desired three dimensional boundary via the one or more second layers of the material.

16. The system of claim 15, wherein the at least one void is fully enclosed between the initial three dimensional boundary and the desired three dimensional boundary.

17. The system of claim 15, wherein the at least one void influences structural properties of the object.

18. The system of claim 15, wherein the at least one void influences failure modes of the object.

19. The method of claim 1, wherein instructing the one or more of the print head or the object articulation mechanism to deposit the first layer of the material conformally around the initial three dimensional boundary comprises:

instructing the one or more of the print head or the object articulation mechanism to deposit the first layer of the material onto the object conformally around the initial three dimensional boundary.

20. The method of claim 1, further comprising:

printing the object based on instructing the one or more of the print head or the object articulation mechanism to deposit the first layer of the material, the one or more second layers of the material, and the third layer of the material conformally around the initial three dimensional boundary.

21. The method of claim 1, wherein instructing the one or more of the print head or the object articulation mechanism to be directed to the first set of orientations, the second set of orientations, and/or the third set of orientations comprises:

instructing the one or more of the print head or the object articulation mechanism to move via three rotational degrees of freedom.

* * * * *